United States Patent [19]

Sato et al.

[11] Patent Number: 4,633,338
[45] Date of Patent: Dec. 30, 1986

[54] MAGNETO-OPTICAL RECORDING AND REPRODUCING APPARATUS HAVING A MAGNETIZATION DIRECTION DETECTING APPARATUS FOR A MAGNETIC RECORDING MEDIUM

[75] Inventors: Noboru Sato; Kenjirou Watanabe, both of Tokyo, Japan

[73] Assignee: Sony Corporation, Tokyo, Japan

[21] Appl. No.: 732,041

[22] PCT Filed: Sep. 5, 1984

[86] PCT No.: PCT/JP84/00424

§ 371 Date: May 6, 1985

§ 102(e) Date: May 6, 1985

[87] PCT Pub. No.: WO85/01144

PCT Pub. Date: Mar. 14, 1985

[30] Foreign Application Priority Data

Sep. 5, 1983 [JP] Japan ................ 58-162817

[51] Int. Cl.$^4$ .............. G11B 5/02; G11B 5/127; G11B 7/00
[52] U.S. Cl. ..................... 360/59; 360/114; 369/100
[58] Field of Search ............ 360/59, 114; 346/74.4; 369/100, 101, 13

[56] References Cited

U.S. PATENT DOCUMENTS

| | | | |
|---|---|---|---|
| 4,472,748 | 9/1984 | Karo et al. | 360/59 |
| 4,495,530 | 1/1985 | Yanagida | 360/59 |
| 4,558,440 | 12/1985 | Tomitz | 360/59 |

*Primary Examiner*—Vincent P. Canney
*Attorney, Agent, or Firm*—Hill, Van Santen, Steadman & Simpson

[57] ABSTRACT

In a magneto-optical recording and reproducing apparatus using a magnetic recording medium having a perpendicular magnetization layer, a magnetization direction detecting apparatus for detecting the magnetization direction of its perpendicular magnetization layer is provided to correctly carry out the recording, reproducing and erasing. In this magnetization direction detecting apparatus, a rectilineally polarized laser light (14) is made incident on a perpendicular magnetization layer (11-2) of a magnetic recording medium magnetized in the same direction previously and a reflected light of this laser light from the perpendicular magnetization layer is detected through an analyzer (19) by a photo detecting element (21) to thereby detect the magnetization direction of the perpendicular magnetization layer by the output level from the photo detecting element.

5 Claims, 8 Drawing Figures

MAGNETO-OPTICAL RECORDING AND REPRODUCING APPARATUS HAVING A MAGNETIZATION DIRECTION DETECTING APPARATUS FOR A MAGNETIC RECORDING MEDIUM

DESCRIPTION

1. Technical Field

This invention relates to a magneto-optical recording and reproducing apparatus having a magnetization direction detecting apparatus of a magnetic recording medium for detecting a magnetization direction of a magnetic recording medium, particularly a magnetic recording medium having a perpendicular magnetization layer on which a recording is carried out in a perpendicular magnetic recording mode or magneto-optical recording mode.

2. Background Art

The recording on a magneto-optical recording medium having a perpendicular magnetization layer, for example, magneto-optical disc is carried out by irradiating the perpendicular magnetization layer with a laser light beam which is modulated in intensity by a recording information signal. In the magneto-optical disc, during the non-recording mode, as shown in FIGS. 1A and 1B, a perpendicular magnetization layer 2 formed on a base plate 1 such as glass plate, acrylic plate and so on is thoroughly magnetized in the direction normal to the layer surface, or in the upward direction shown by arrows in FIG. 1A or in the downward direction shown by arrows in FIG. 1B. As shown in FIG. 2 the beam spot of a laser light L.B is incident on, for example, the magneto-optical disc magnetized upward shown in FIG. 1A to thereby form a cylindrical magnetic domain or a magnetic bubble domain with inverted magnetization in the portion irradiated with the beam spot and, thus the information is recorded. In this case, in order to positively form a magnetic bubble with inverted magnetization, the magneto-optical recording medium has applied to it an auxiliary bias magnetic field $H_W$ of about 500 Oe in the direction opposite to the magnetization direction in the non-recording mode. On the other hand, when an information is rewritten in the magnetization layer 2 on which the recording is carried out as described above and hence a magnetic bubble 3 is formed, if the magnetic bubble 3 shown in FIG. 2 is erased, an erasing magnetic field $H_E$ of about 700 Oe to 1000 Oe in the same direction as the magnetization direction during the non-recording mode is applied to the magnetization layer 2 and the laser light L.B is irradiated thereon so as to return the inverted magnetization direction of the magnetic bubble 3 to the original layer direction, and thus the magnetic bubble is erased.

As described above, when the information is recorded on and erased from the magneto-optical recording medium, for example, a magneto-optical disc, the directions of the external magnetic field $H_W$ and $H_E$ must correlate with the magnetization direction of the magnetic layer 2 so that it is preferable to detect the magnetization direction of the magnetization layer 2 prior to recording.

The magnetic recording medium of this kind is often formed such that the recording layer, i.e., the perpendicular magnetization layer is formed on both surfaces thereof so as to double the recording density. In this case, as shown in FIG. 4, since the perpendicular magnetization layers of both surfaces are magnetized in the same direction at the same time in a common magnetic field, it is preferable to determine the direction of the auxiliary biasing magnetic field $H_W$ or the erasing magnetic field $H_E$ in accordance with the recording on the front or back surfaces. In other words, it is preferable to select the direction of the magnetic fields $H_W$ and $H_E$ by detecting the front and back surfaces of the perpendicular magnetization layer.

This invention provides a magneto-optical recording and reproducing apparatus having a magnetization direction detecting apparatus of the magnetic recording medium capable of easily and positively detecting the magnetization direction of the perpendicular magnetization layer on the front and back surfaces of the magnetic recording medium having the above-described magnetization layer.

DISCLOSURE OF INVENTION

In this invention, as shown in FIG. 5, on the perpendicular magnetized layer of the magnetic recording medium such as a magneto-optical disc 11, there is formed a non-recording area which includes an annular recording area portion 11-2a on which magnetic tracks are formed, for example, a read-in portion 11-2b at the innermost periphery of the disc and/or a read-out portion 11-2c at the outermost periphery thereof. A laser light beam that is rectilineally polarized is applied incident on the read-in portion 11-2b and/or the read-out portion 11-2c and the laser light beam reflected Therefrom has a rotation angle of polarization which is different and depends on the Kerr effect of the perpendicular magnetized layer, or on the magnetization direction of the magnetized layer, is passed through an analyzer. The amount of the light beam which passes through the analyzer is changed in accordance with the rotation angle. The change in the light beam is detected as the magnitude of an output level signal with a photo detecting element to thereby detect the magnetized direction of the perpendicular magnetized layer on the front and back surfaces thereof.

BEST MODE FOR CARRYING OUT THE INVENTION

Figure 1A:
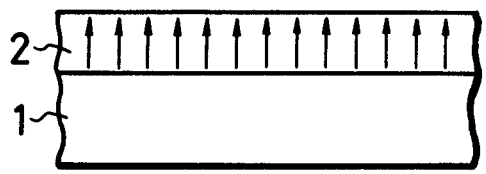
FIG. 1A and FIG. 1B are diagrams showing the magnetized states of a magnetic recording medium having a perpendicular magnetized layer.
Figure 1B:
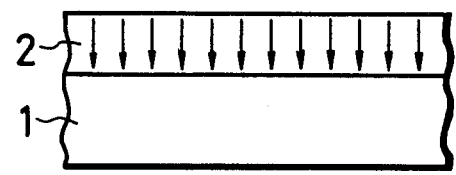
Figure 2:
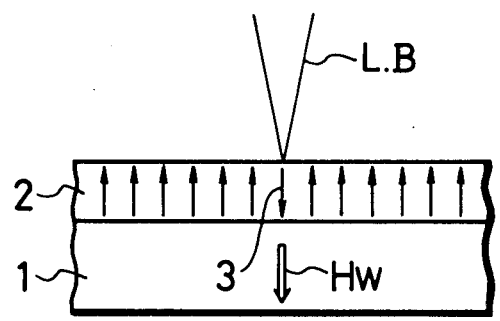
FIG. 2 and FIG. 3 are diagrams useful for explaining the recording and erasing thereof.
Figure 3:
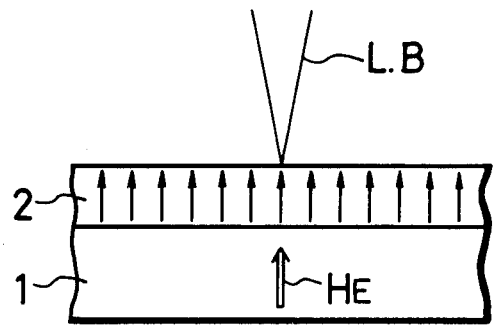
Figure 4:
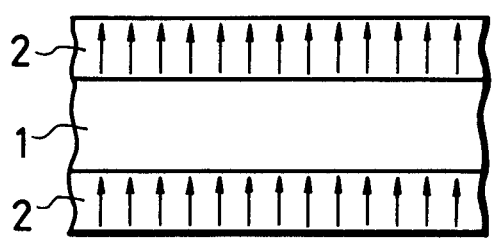
FIG. 4 is a diagram showing a magnetized state of a magnetic recording medium having on both surfaces the perpendicular magnetized layers.
Figure 5:
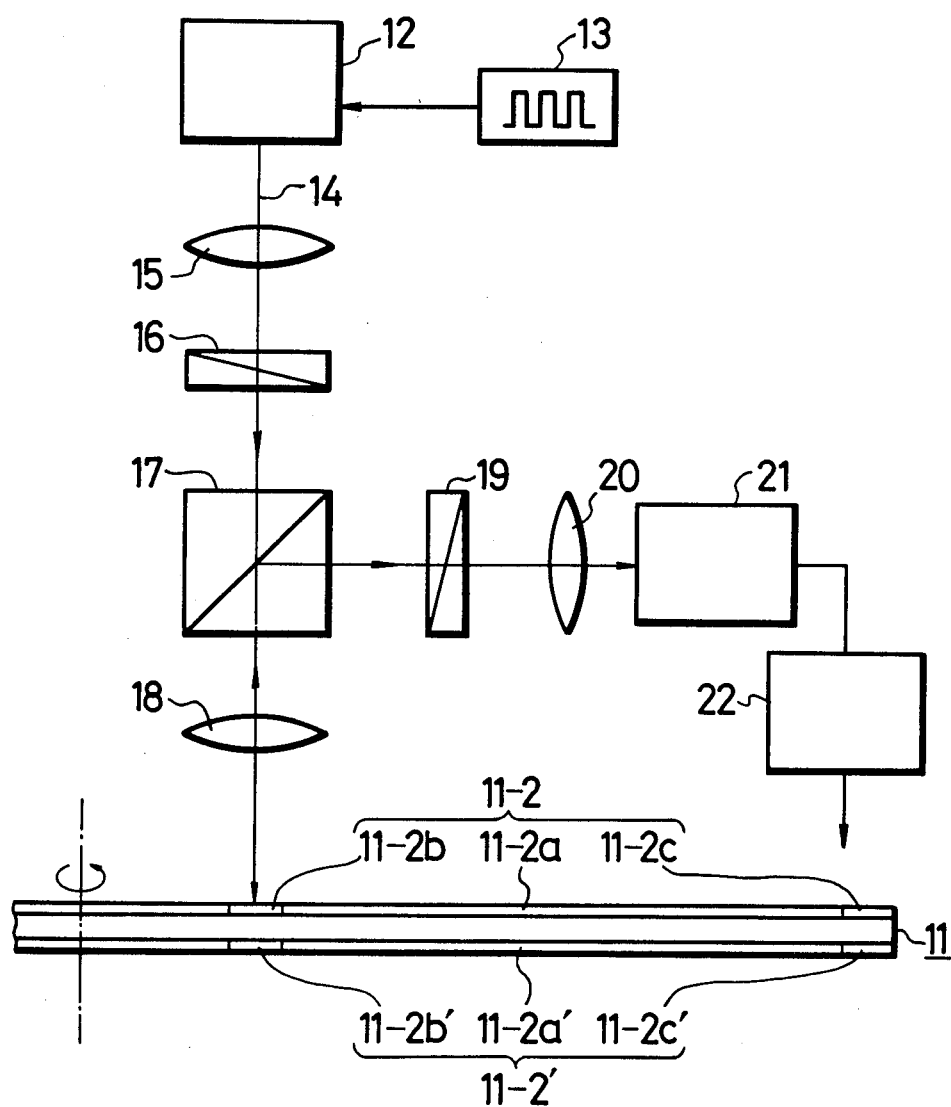
FIG. 5 is a diagram showing an embodiment of a magnetization direction detecting apparatus of magnetic recording medium according to the present invention.
Figure 6:
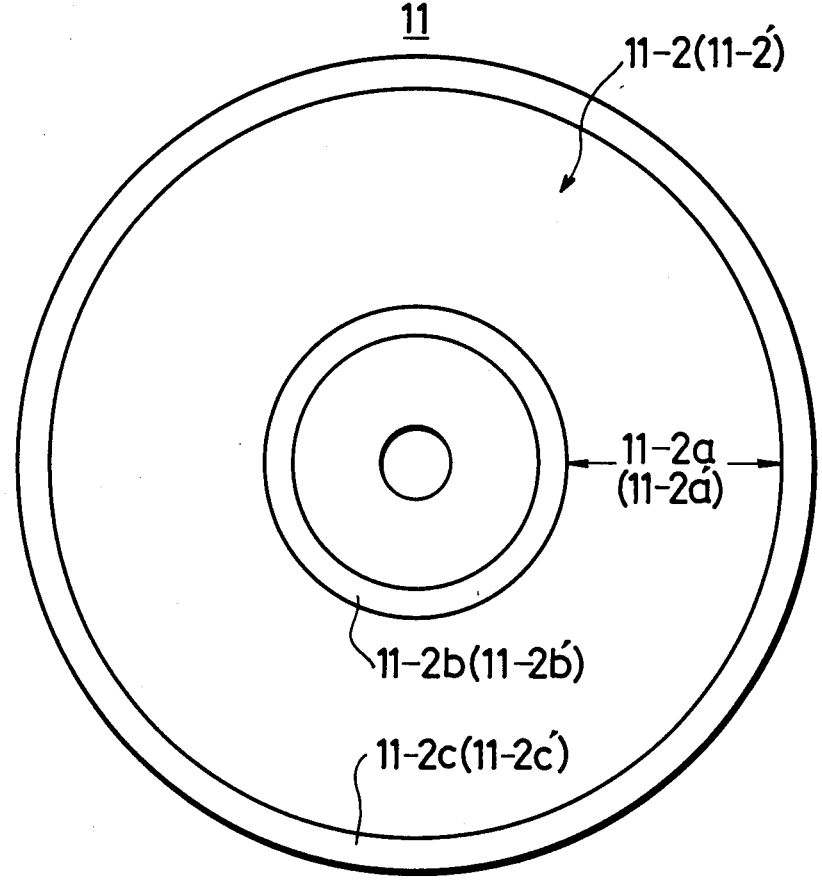
FIG. 6 is a diagram useful for explaining a magneto-optical disc thereof.
Figure 7:
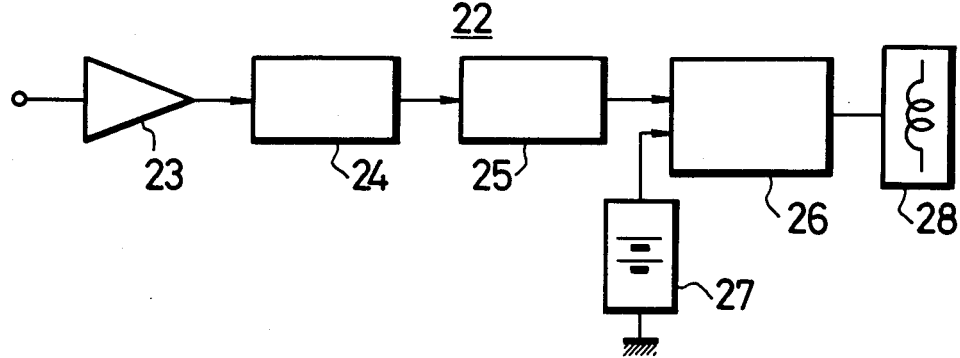
FIG. 7 is a block diagram showing an example of a signal processing circuit.

An embodiment of a magnetization direction detecting apparatus for detecting a magnetization direction of a magneto-optical disc according to the present invention will be described with reference to FIG. 5. Referring to the figures, reference numeral 11 designates a magneto-optical disc on which perpendicular magnetization layers 11-2 and 11-2' each magnetized in the same direction are formed, for example, on both surfaces thereof. As shown in FIG. 6, reference numerals 11-2a and 11-2a', respectively, designate signal recording areas of the perpendicular magnetization layers 11-2 and 11-2' on the respective surfaces, 11-2b and 11-2b' designate read-in portions on which no signal is recorded and 11-2c and 11-2c' designate read-out portions on which no signal is recorded. Reference numeral 12 designates a laser light beam source section which produces a laser light beam which is an intensity-modulated laser light beam obtained from a laser light oscillation source such as a semiconductor laser, a gas laser and so on with an AC signal having a single frequency produced from an oscillating circuit 13. The laser light beam 14 from the laser light source section 12 travels through a lens system 15 and is then rectilineally polarized by a polarizer 16. The rectilineally polarized laser light beam is irradiated after being focussed through a half mirror 17 and an objective lens 18 onto the read-in portion 11-2b of one of the perpendicular magnetization layers 11-2 of the medium 11. The laser light beam incident on the read-in portion 11-2b of the perpendicular magnetization layer 11-2 of the medium 11 as described above is reflected from layer 11-2b which causes, its polarization axis to be rotated due to the Kerr effect of accordance with the magnetization direction in the magnetization layer 11-2b. On the other hand, the reflected laser light is changed in direction by the half mirror 17 and is supplied to an analyzer 19. The laser light beam passes through the analyzer 19 and a lens system 20 and then to a photo detecting element 21, for example, a photo diode which detects and converts it into an electrical signal. The electrical signal thus converted by the photo detecting element 21 is processed by a processing circuit 22 which then produces desired control signals. The control signals, are supplied to an electromagnetic coil which is energized so as to produce the auxiliary bias magnetic field $H_W$ which is used during recording on areas 11-2a, 11-2a' by changing the polarity and for controlling starting of the recording. As, for example, shown in FIG. 7, the processing circuit 22 comprises an amplifier 23, a low-pass filter 24, an integrating circuit 25 and a comparing circuit 26. The comparing circuit 26 compares the voltage from the photo detecting element with a reference voltage from a reference voltage source 27 so as to produce a compared output which energizes a coil 28 for producing the described auxiliary biasing magnetic field or the erasing magnetic field and the energized direction is determined to thereby apply the predetermined auxiliary biasing magnetic field $H_W$ or the erasing magnetic field $H_E$ to the recording area 11-2a of the perpendicular layer.

According to the above-described arrangement, since the rotation angle produced by the Kerr effect which acts on the rectilineally polarized laser light beam which is incident on the magnetization layer varies and is dependent on the magnetization direction of the magnetization layer 11-2b, it is possible to detect the magnetization direction of the light beam of the reflected light beam by passing it through the analyzer 19. In, for example, FIG. 5, under the condition that the medium 11 whose magnetization direction is to be detected is replaced with a magnetization layer which has a magnetization direction which is previously known, for example, a magnetization layer magnetized in the direction from the lower side to the upper side and the polarization axis of the analyzer 19 is determined so as to pass the reflected light beam of laser light which passes through the polarizer 16. If the detected magnetization layer is magnetized upwardly in FIG. 5, the amount of the light beam passing through the analyzer 19 increases, while if the detected magnetization layer is magnetized in a downward direction, the amount of the light beam decreases. Thus, the magnetization direction can be detected by detecting the increase or decrease of the light beam with the photo detecting element 21, which may be, for example, a photo diode. In this case, as described above, when the irradiation laser light beam is modulated with the AC signal, an output signal having the same frequency as the frequency of the AC signal is produced from the detecting element 21 so that the direction of magnetization of the detected magnetization layer 11-2b is produced as the difference of the output level signal. Accordingly, if this output is processed by the processing circuit 22, it is possible to apply suitable magnetic fields $H_W$ or $H_E$ in accordance with the direction of magnetization of the magnetization layer.

The same operation is carried out on the second perpendicular magnetization layer 11-2'.

While in the above embodiment this invention is applied during recording to a case in which the front and back surfaces of the perpendicular magnetization layer of the magneto-optical recording medium is detected, this invention can also be applied to a case in which the front and back surfaces of the magnetic recording medium of the perpendicular mode recording system are detected.

While in the above-described embodiment the laser light beam which is modulated in intensity by the AC signal is produced from the laser light beam source 12, it is possible to detect the direction of magnetization with a laser light beam which is modulated not by an AC signal but by a DC signal.

Further, the detecting laser light beam source can take various modifications.

As set forth above, according to the apparatus of the present invention, since the rectilineally polarized laser light is irradiated onto the perpendicular magnetization layer of the magnetic recording medium and the Kerr effect of the direction of magnetization layer is utilized to detect the magnetization, or the front and back surfaces of the magnetization layer, detection can be positively accomplished and thus, recording and reproducing can be accurately done. Accordingly, troubles are avoided and the invention has many advantages in use.

What is claimed is:

1. A magneto-optical recording and reproducing apparatus having a direction of magnetization detecting apparatus of a magnetic recording medium, characterized in that a rectilineally polarized laser light beam is projected onto a perpendicular magnetization layer of the magnetic recording medium which has been previously magnetized in a first direction, a reflected light beam from said laser light beam from said perpendicular magnetization layer is detected after passing through an analyzer to a photo detecting element, and a means for detecting the direction of the magnetization of said perpendicular magnetization layer by the output signal level of said photo detecting element, and the polarity of a magnetic field is changed by said means for detecting the direction of magnetization.

2. A magneto-optical recording and reproducing apparatus having a direction of magnetization detecting apparatus of a magnetic recording medium according to claim 1, characterized in that said magnetic field is an auxiliary biasing magnetic field.

3. A magneto-optical recording and reproducing apparatus having a direction of magnetization detecting apparatus of a magnetic recording medium according to claim 2, characterized in that said auxiliary biasing magnetic field is generated from a coil which has the direction of its current supply changed in response to said output signal from said means for detecting the direction of magnetization.

4. A magneto-optical recording and reproducing apparatus having a direction of magnetization detecting apparatus of a magnetic recording medium according to claim 1, characterized in that said magnetic field is an erasing magnetic field.

5. A magneto-optical recording and reproducing apparatus having a direction of magnetization detecting apparatus of a magnetic recording medium according to claim 4, characterized in that said erasing magnetic field is generated with a coil in which the direction of its current supply is changed in response to an output signal from said means for detecting the direction of magnetization.

* * * * *